Jan. 3, 1933. A. L. PARKER 1,893,441
TUBE COUPLING
Filed July 7, 1930
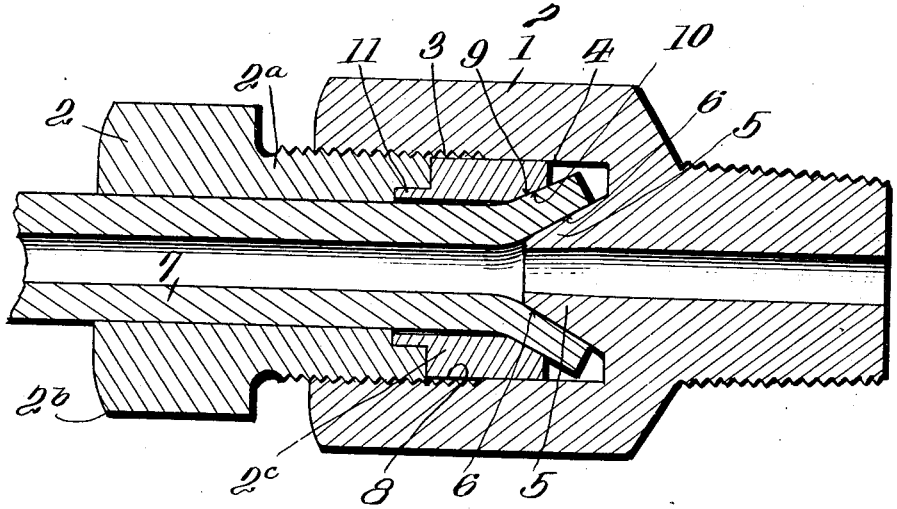
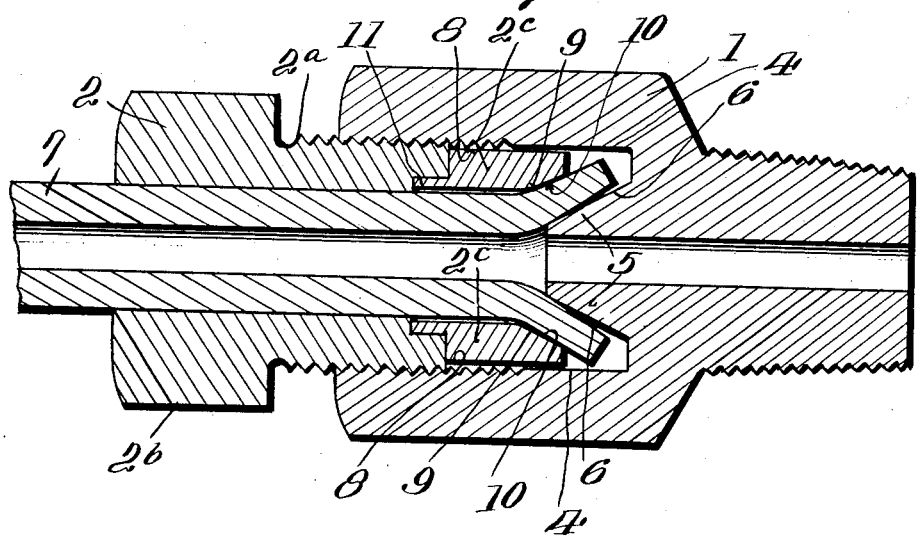
Inventor
Arthur L. Parker
By
Sturtevant, Mason & Porter
Attorneys Patented Jan. 3, 1933

1,893,441

UNITED STATES PATENT OFFICE

ARTHUR L. PARKER, OF CLEVELAND, OHIO

TUBE COUPLING

Application filed July 7, 1930. Serial No. 466,282.

The invention relates to new and useful improvements in tube couplings, and more particularly to a tube coupling adapted to clamp the flared end of a metal tube.

An object of the invention is to provide a tube coupling wherein the flared end of the tube is clamped between seats on the coupling members, which coupling members yield to bring about an intimate contact between the seats and the flared end of the tube throughout substantially the entire extent of the seats, and wherein the coupling members are so constructed that there is little or no rotating movement of the seats on the flared end of the tube during the final clamping of the tube end.

In the drawing:—

Figure 1 is a sectional view through a coupling embodying the improvements and showing the coupling as clamping the end of a tube;

Fig. 2 is a view similar to Fig. 1 but showing the coupling parts when they first engage the flared end of the tube and before the clamping pressure has been applied thereto.

The coupling for tubes is of the character shown in my Patent No. 1,619,755, granted March 1, 1927. The coupling includes a male coupling member and a female coupling member which are adapted to clamp the flared end of a tube. The present invention is directed to an improvement in the construction of the male member whereby said coupling is especially adapted for heavy duty installations where the tube is very thick, and where it is necessary to tighten the couplings very tight. The female coupling member is substantially the same as in the Parker patent. It has an inner threaded portion adapted to receive a threaded portion on the male member. It also has an inner cylindrical surface adapted to cooperate with a cylindrical part formed as a part of the male coupling member. The female member is also provided with a tapered seat which is adapted to extend into the flared end of a tube and serving as the inner clamping member for clamping the end of the tube. The male member in the present form of the invention is made in two parts. The cylindrical portion is separate from the threaded portion, although it may be attached thereto as a unit. This cylindrical portion is provided with an inner tapered seat which is adapted to engage the outer flared face of the tube. The tapered seats are initially substantially parallel and the portions of the couplings carrying the seats are so dimensioned that the metal parts of the couplings yield so as to bring about an intimate contact throughout the entire extent of the seats where they contact with the tube. By making the male member in two parts the tapered seats during the final clamping of the flared end of the tube do not have any rotating movement on the tube, thus the friction incident to the clamping of the tube is reduced and a tighter clamping action can be accomplished.

Referring more in detail to the drawing, the coupling for the flared tube consists of a female member 1 and a male member 2. The female member is provided with a threaded portion 3, and a smooth cylindrical portion 4. Said female member is also provided with a projecting portion 5 which is inclined so as to form a clamping seat 6. The tube as shown in the drawing is indicated at 7. The coupling is particularly adapted to clamp tubes made of copper, aluminum, brass, steel and other metals and alloys thereof of similar plastic character. The male member is formed in two sections. The portion $2^a$ is threaded on its exterior so as to engage and cooperate with the thread 3 on the female member to bring about a clamping of the tube end. Said section $2^a$ is provided with the usual nut portion $2^b$ whereby it may be turned for clamping the tube end. The female member is also provided with a similar slabbed section forming a nut whereby it may be turned or held during the clamping of the tube end. This male member is also provided with a section 2ᵇ. The section 2ᶜ is formed with an outer cylindrical face 8 which is of substantially the same diameter as the inner cylindrical face of the female member. There is, of course, sufficient clearance or tolerance between these surfaces to permit the portion 2ᶜ to be readily moved endwise in the female member. The cylindrical surface 4 is of substantially the same diameter as the inner diameter of the threads 3. Likewise the diameter of the cylindrical surface 8 is substantially that of the base of the threads on the male member. This section 2ᶜ of the male member is provided with an inclined face 9 forming the outer tapered clamping seat which engages the outer face 10 of the flared end of the tube 7. The tapered seat 9 on the male member and the tapered seat 6 on the female member are initially substantially parallel. The male member with the section 2ᵇ associated with the section 2ᵃ are slipped onto the tube after which the end thereof is flared by a suitable flaring tool so that the outer face of the flared end of the tube conforms as to angle substantially with the angle of the face 9 on the male member. This face 9 of the male member serves as a gage for determining the angle to the outer face of the flared end of the tube. In the flaring of the end of the tube the metal is tapered toward the outer end of the flare so that the inner and outer faces of the flared end of the tube are at a slight angle to each other.

As shown in the drawing, the section 2ᵇ is provided with a projecting sleeve section 11, which extends into a recess in the section 2ᵃ of the male member, or it may extend all the way through said section. These parts are proportioned so that there is a frictional gripping fit between the parts, and the section 2ᶜ may therefore be attached to the section 2ᵃ so that the two sections may be handled and operated as a unit. Other ways of tightening the two parts may be used, or from certain aspects of the invention the inner end of the section 2ᵃ may be a straight vertical wall bearing against the outer vertical wall of the section 2ᶜ.

After the male member has been placed on the tube the end is flared as above noted, after which the male member is inserted in the female member and is turned into the same. In Fig. 2 of the drawing the parts are shown in the position when the seat on the male member and the seat on the female member first make contact with the flared end of the tube. The proportioning of the parts and the inclination of the tapered seats on the male and female members are such that when the male member is turned into the female member there will be a yielding of the metal parts of the coupling. The pressure of the section 2ᵇ against the flared end of the tube will first cause the inner end of this section 2ᶜ to expand outwardly taking up the entire clearance or tolerance space between the face 8 and the face 4 of the female member. This makes a very solid abutment which reacts through the flared end of the tube to bring about a re-positioning of the seat 6 through the yielding of the metal in the female coupling until said seat 6 makes intimate clamping contact with the inner face of the flared end of the tube throughout the entire extent of said flared end. As the male member is threaded into the female member the section 2ᶜ may possibly at first turn with the section 2ᵃ until the friction between the seat 9 and the face of the flared end of the tube is greater than the frictional grip between the two sections of the male member. After this the section 2ᶜ does not rotate or turn with the section 2ᵃ. It is pressed directly forward into clamping contact with the flared end of the tube. This avoids the frictional resistance between the seats and the flared end of the tube during the final gripping force which is applied to the tube and which is present when the coupling members must rotate relative to each other during the final clamping action. Inasmuch as the frictional grip between the parts is reduced during the final clamping action the turning of the male member so as to force the same into clamping contact with the flared end of the tube is much more efficient in its action and a tighter clamping of the tube end is accomplished.

As noted above, this is of particular advantage in connection with heavy duty installations. When the couplings are forced into this firm gripping contact with the flared end of the tube there is a stretching or yielding of the metal parts above referred to, and not only is the difference in angularity between the faces of the seats and the faces of the flared end of the tube compensated for, but there is a continuous re-acting force which maintains the seats of the tube coupling in contact with the flared end of the tube.

It is obvious that minor changes in the details of construction and the arrangement of the parts may be made without departing from the spirit of the invention as set forth in the appended claim.

Having thus fully described my invention, what I claim as new and desire to secure by Letters Patent, is:—

In a tube coupling, a female member having an integral portion forming a tapered seat adapted to extend into the flared end of a tube, and a cylindrical portion which is opposed to the tapered seat, and means for clamping said tube end on the seat on said female member comprising a male member having a threaded engagement with the female member and consisting of inner and outer sections, one of said sections having an annular recess therein and the other section having an annular projecting member adapted to snugly fit within the recess and hold said inner and outer sections assembled while permitting relative rotation between the members during the clamping of the tube end, said inner section having a smooth cylindrical face adapted to contact with the cylindrical face on the female member when clamping the tube end, and having a tapered seat adapted to engage the outer face of the flared end of the tube.

In testimony whereof, I affix my signature.

ARTHUR L. PARKER.